Jan. 7, 1964
H. A. TIDD
3,116,750
INTERMITTENTLY REVERSING CONTROL VALVE
Filed Jan. 9, 1962
2 Sheets-Sheet 1
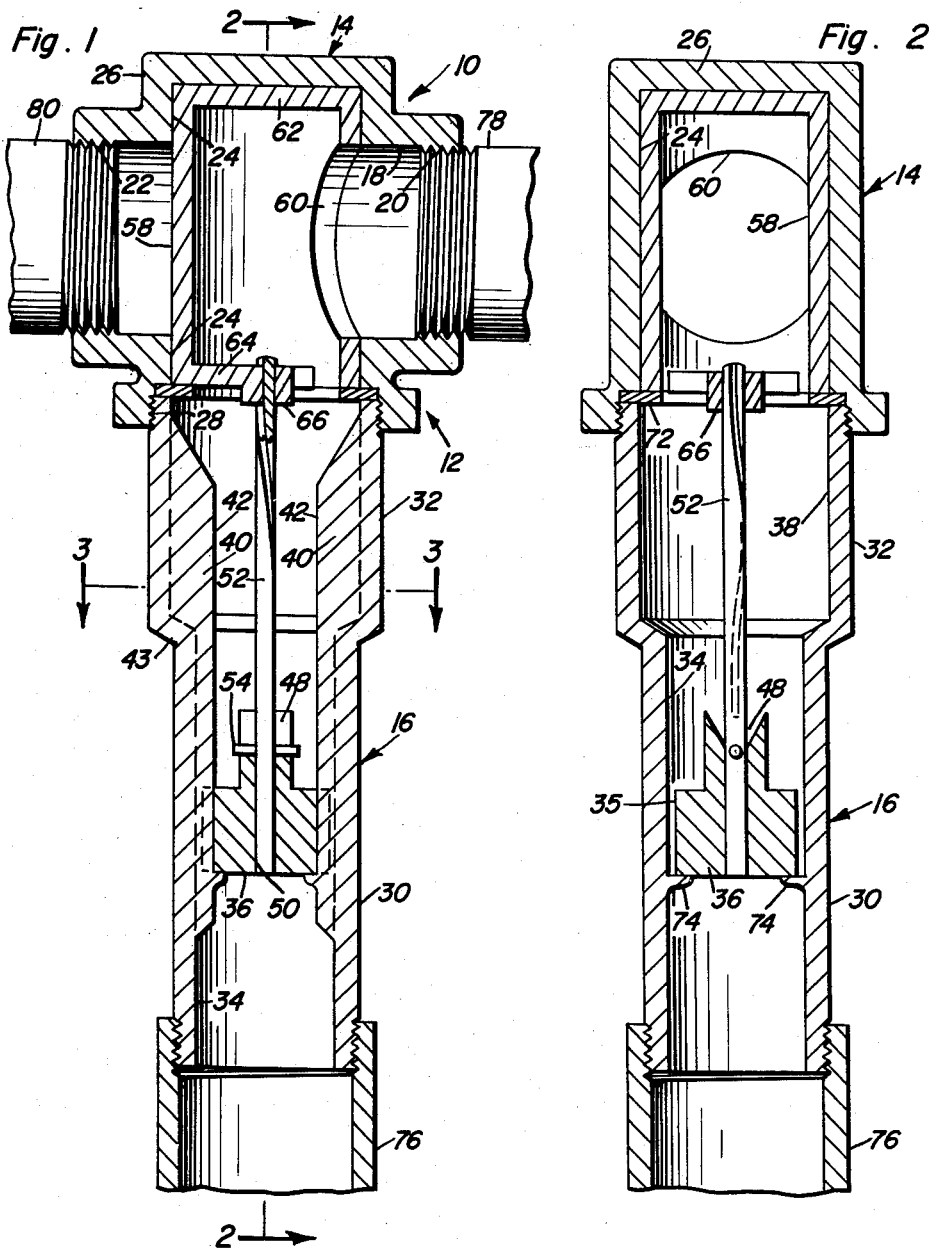
Howard A. Tidd
INVENTOR.

Jan. 7, 1964 H. A. TIDD 3,116,750
INTERMITTENTLY REVERSING CONTROL VALVE
Filed Jan. 9, 1962 2 Sheets-Sheet 2
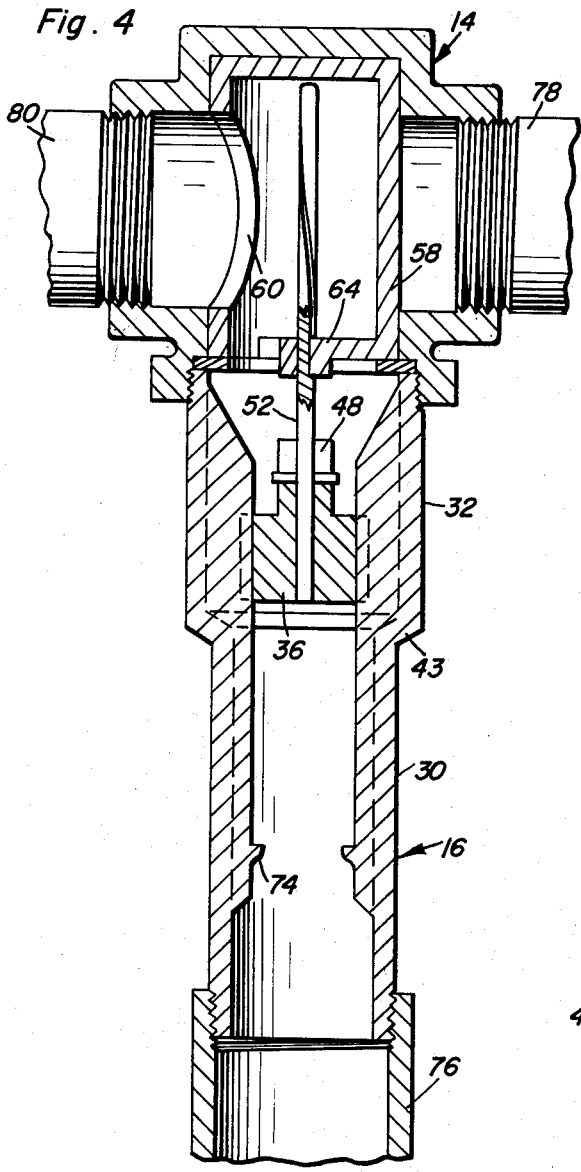
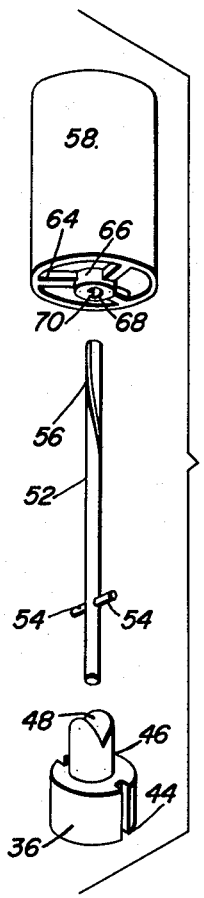
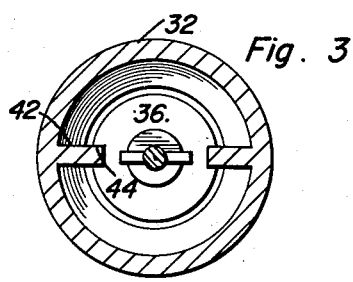
Howard A. Tidd
INVENTOR.

United States Patent Office 3,116,750
Patented Jan. 7, 1964

3,116,750
INTERMITTENTLY REVERSING CONTROL VALVE
Howard A. Tidd, 1929 NW. 3rd Ave.,
Wilton Manors, Fla.
Filed Jan. 9, 1962, Ser. No. 165,093
5 Claims. (Cl. 137—119)

This invention relates to fluid control devices, and more particularly to a valve which controls the flow of a fluid from a supply line to any one of a plurality of outlet lines and which valve is operative in response to intermittent changes in pressure in the supply line.

Accordingly, it is the primary object of the invention to provide a selector valve which is operative by means of changes in pressure or intermittent pressure fluctuations in the supply pipe connected to the valve.

It is another object of the invention to provide an automatically operating valve which is so designed that it permits substantially free flow therethrough without reducing the pressure or quantity of flow through a fluid system.

It is another object of the invention to provide a valve that is automatic in operation and yet has only three moving parts, simple in design, and is therefore economical to manufacture and maintain.

It is still a further object of the invention to provide a valve which is particularly adapted for supplying water selectively to a plurality of sprinklers from a single source of pressure and the valve is provided with means for automatically connecting the source of pressure to a different sprinkler merely by fluctuating the pressure in the supply line. This permits the valve to be operated remotely.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross-sectional view through one form of the valve;

FIGURE 2 is a vertical cross-sectional view taken substantially on the plane of line 2—2 in FIGURE 1;

FIGURE 3 is an enlarged cross-sectional view taken substantially upon the plane of line 3—3 in FIGURE 1;

FIGURE 4 is a vertical cross-sectional view similar to FIGURE 1 but showing the parts of the valve in a different position; and FIGURE 5 is an exploded view in perspective showing the three moving parts of the valve.

With continuing reference to the drawings wherein like reference numerals indicate the same parts, it can be seen that the novel valve assembly 10 includes a T-shaped housing 12 comprising a head 14 and a stem 16. As shown in FIGURE 2, the head 14 is substantially rectangular in cross-section but includes a bore 18 therethrough which terminates in circular threaded openings 20 and 22. The head 14 is also provided with a second circular bore 24 extending part way through the center thereof and intersecting the central portion of the bore 18. The upper end of the bore 24 is covered by a rectangular cover or extension 26. The bottom end of the bore 24 is enlarged to provide a threaded inlet connection or opening 28.

The stem 16 is preferably circular in cross-section as shown in FIGURE 3 and as shown in FIGURES 1 and 2 comprises a lower portion 30 integrally connected to an upper enlarged portion 32. The lower portion 30 is provided with a circular bore 34 therethrough for receiving loosely and slidably therein a circular piston 36 of considerably smaller diameter than the bore 34. The bore 34 extends into a larger bypass bore 38 in the upper portion 32.

Diametrically opposed ribs 40 are integrally formed within the stem 16. These ribs project radially toward one another and terminate in parallel edges 42. Piston 36 is provided with longitudinally extending slots 44 which slidably receive the radial inner portions of the ribs 40.

The piston 36 is provided with a reduced cylindrical extension 46 on its upper surface, and this extension is provided at its upper end with a V-shaped cam slot 48. A longitudinal circular bore 50 is provided through the central portion of the piston 36 and its extension 46.

A cylindrical piston rod 52 of slightly smaller diameter than the bore 50 normally has its lower portion extending into the bore of the piston as illustrated in FIGURE 1. Radially projecting aligned ears 54 are secured to the lower portion of the piston rod and normally rest in the bottom of the slot 48 and therefore act as a support for limiting downward movement of the rod 52. The upper portion of the rod 52 is provided with a spiral groove 56.

A cylindrical valve member 58 is rotatably mounted in the bore 24. This valve member is hollow and has a radially extending outlet bore 60 formed in one side wall thereof. One end of the valve member is closed by an end wall 62 and the other end of the valve member is provided with a spider comprising a plurality of arms 64 and a central hub 66. The hub 66 has a central axial bore 68 therethrough for receiving the piston rod 52. A projection 70 extends into the bore 68 and within the spiral groove 56 in the rod 52.

An annular washer 72 is seated within the end of the inlet 28. The end of the upper portion 32 is threaded into the inlet 28 and secures the washer 72 in the inlet and against the lower end of the valve member 58. The washer thus acts as a bearing for the valve member and retains the valve member within the head 14.

The central portion of the bore 34 is provided with radially inwardly projecting stop lugs which have coplanar upper radially extending surfaces for supporting the piston 36 in its lowermost position.

The lowermost end of the stem 16 is threadedly connected to a fluid supply pipe 76. The other end of the supply pipe is preferably connected to a water pump which is controlled by a clock or timer mechanism. The head 14 has its outlet openings 20 and 22 threadedly connected to outlet pipes 78 and 80. These pipes may be each connected to a water sprinkler.

FIGURE 1 and FIGURE 2 illustrate the location of the various parts of the valve when it is not in use. When water pressure is supplied to the supply pipe 76, the water pressure acts against the bottom face of the piston 36 and forces it upwardly. As the piston moves upwardly, the ears 54 of the rod 52 being in the bottom of the V-shaped groove 48, the rod 52 is also pushed upwardly. As the rod moves upwardly, it passes through the bore 68 in the valve member 58 and the projection 70 and valve member are rotated by the spiral groove 76 as it passes over the projection. The ribs 40 prevent rotation of the piston 36 and the ears 54 and slot 48 prevent relative rotation between the rod 52 and piston. The water pressure continues to push the piston and rod upwardly until the upper end of the rod abuts against the end wall 62 of the valve member thus limiting further upward movement of the piston and rod. In this position of the piston and rod, the valve member 58 has been rotated 180° whereby the outlet bore 60 therein has been moved from alignment with the outlet opening 20 to alignment with the outlet opening 22. Thus it can be seen that the supply of water has been diverted from the pipe 78 to the pipe 80. The differential in water pressure on the upper and lower surfaces of the piston 36 maintain it in its upward position as illustrated in FIGURE 4.

Both the piston and rod are heavier or more dense than the liquid flowing through the valve. Thus, if it is desired to again rotate the valve member 180° for supply water to a different sprinkler, it is only necessary that the pressure in the pipe 76 be reduced sufficiently to permit gravity to pull the piston and rod 52 downwardly. As the piston and rod move downwardly, they temporarily separate because of the drag of the projection 70 within the spiral groove 56 and the separating action caused by cam slot 48 reacting against the ears 54. Thus, the piston 36 rapidly moves downwardly and settles on the stop lugs 74 then the rod 52 more slowly follows the piston downwardly. As the rod moves downwardly it is rotated by the spiral groove and projection 70 to its original position whereupon it is aligned with the slot 48 and settles therein as illustrated in FIGURE 1. The inertia and friction of the valve member 58 prevents it from rotating while the rod moves downwardly.

From the above description, it is apparent that the valve member 58 will be rotated 180° each time there is a fluctuation in pressure in the inlet pipe 78 for a sufficient period of time. The fluctuation of pressure in the pipe 76 may be caused by the above disclosed timer mechanism cutting on and off the pump supplying pressure to the inlet pipe and thereby causing the valve to alternatively supply water to each of the sprinklers, not shown, connected to the pipes 78 and 80. However, it is apparent that the valve 10 could be used for other purposes.

While there have been only two outlet openings disclosed in the valve housing or head 14, it is apparent that three or more outlet openings could be provided and the opening 60 in the valve member 58 could be aligned with a plurality of openings intermittently merely by designing the spiral groove 56 to turn the valve member the proper distance or through the proper angle each time the piston 36 reciprocates down and up.

Preferably, the components of the valve with the exception of the piston and rod are composed of plastic. Of course, since the piston and rod are relatively heavy, these members are preferably composed of metal.

To assemble or disassemble the valve it is only necessary to unscrew the stem 16 out of the threaded opening 28 and then the various valve parts may be disassembled or assembled in an obvious manner.

It is to be noted that a space 35 is provided between the piston and bore 34 so as to permit the piston to settle by gravity within the bore onto the projection 74 when pressure is reduced in the supply pipe 76.

The cam slot 48 and ears 54 function during operation of the valve as a one-way clutch. While other types of one-way clutches could be substituted, the cam and ears comprise a one-way clutch which is extremely simple and economical to manufacture, and is substantially foolproof and jamproof in operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an upright housing including a head portion on its upper end and having an upstanding bore formed therein communicated with the exterior of said housing at its lower end portion and extending upwardly into said head portion, a hollow valve member journaled in the upper end of said bore, opening downwardly into said bore and having a radial opening formed therein, said head portion having a pair of laterally outwardly extending openings formed therein with which said radial opening may be selectively registered upon rotation of said valve member, a piston member loosely and freely slidable in said bore and movable upwardly therein in response to an increase of the velocity of the liquid flow upwardly through said bore and yet readily movable downwardly in said bore by gravity in response to a reduction in the velocity of fluid flow upwardly through said bore, lost motion means connecting said piston member to said valve member for intermittently rotating said valve member in response to reciprocation of said piston in said bore, said lost motion means including means establishing a driving connection between said piston member and said valve member upon the rising of said piston member in said bore and a lost motion connection between said piston member and said valve member upon the lowering of said piston member in said bore.

2. The combination of claim 1 wherein said lost motion means comprises an elongated body connected at opposite end portions to said members for rotating said valve member in direct response to the rising of said piston member in said bore.

3. The combination of claim 1 wherein said lost motion means comprises an elongated spiral body slidably connected and keyed at one end to said valve member for rotation of the latter in response to axial shifting of said body towards said valve member, said elongated body and said piston member including coacting clutch means connecting said body to said piston member against rotation relative to the latter when said piston is supporting said body and disengageable for free rotation of said body about its longitudinal axis relative to said piston member upon downward movement of said piston member relative to said body, and means keying said piston member to said housing against rotation in said bore.

4. The combination of claim 3 wherein said coacting clutch means comprises an upwardly opening transversely extending groove formed in the upper end of said piston member and a transversely extending projection carried by said body receivable in said groove.

5. The combination of claim 4 wherein said groove includes opposite side walls which are downwardly convergent.

References Cited in the file of this patent

UNITED STATES PATENTS

| | | |
|---|---|---|
| 1,673,451 | Hartfield | June 12, 1928 |
| 2,619,105 | Hauser | Nov. 25, 1952 |
| 2,641,280 | Fleischhauer | June 9, 1953 |